United States Patent
Kim et al.

(10) Patent No.: US 6,707,788 B1
(45) Date of Patent: Mar. 16, 2004

(54) CHANNEL SPREADING DEVICE AND METHOD IN CDMA COMMUNICATION SYSTEM

(75) Inventors: Jae-Yoel Kim, Kunpo-shi (KR); Hee-Won Kang, Seoul (KR); Seung-Joo Maeng, Songnam-shi (KR); Young-Ky Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/456,731

(22) Filed: Dec. 8, 1999

(30) Foreign Application Priority Data

Dec. 8, 1998 (KR) .............................. 98-54296

(51) Int. Cl.$^7$ ........................ H04B 15/00; H04L 27/32
(52) U.S. Cl. ..................... 370/203; 370/209; 375/142; 375/150
(58) Field of Search ................. 370/203, 204, 370/208, 209, 210, 320, 441, 479, 491, 515; 375/140, 147, 149, 150, 142

(56) References Cited

U.S. PATENT DOCUMENTS

| | | | |
|---|---|---|---|
| 5,550,811 A | * 8/1996 | Kaku et al. | 370/342 |
| 5,889,815 A | * 3/1999 | Iwakiri | 370/342 |
| 5,926,503 A | * 7/1999 | Kelton et al. | 375/148 |
| 5,943,361 A | * 8/1999 | Gilhousen et al. | 370/320 |
| 6,005,883 A | * 12/1999 | Trompower | 375/141 |
| 6,154,487 A | * 11/2000 | Murai et al. | 375/150 |
| 6,233,271 B1 | * 5/2001 | Jones et al. | 375/142 |
| 6,272,168 B1 | * 8/2001 | Lomp et al. | 370/342 |

\* cited by examiner

Primary Examiner—Edward F. Urban
Assistant Examiner—Simon D Nguyen
(74) Attorney, Agent, or Firm—Dilworth & Barrese, LLP

(57) ABSTRACT

A demodulation method in a mobile station having a plurality of channels, for receiving a signal from a base station. In one aspect, the base station has a plurality of channels, a BPSK spreader for orthogonally spreading symbol data of each channel with an assigned orthogonal code, and a QPSK spreader for PN-spreading the orthogonally spread signal with a PN code. In the demodulation method, a first QPSK despreader in the mobile station receives PN-spread signal and PN-despreads the PN-spread signal with the PN code, and a second QPSK despreader orthogonally despreads the PN-despread signal with a complex orthogonal code having the real and imaginary parts of the assigned orthogonal code. In another aspect, the base station has a plurality of channels, a QPSK spreader for spreading symbol data of each channel by the real and imaginary parts of its assigned orthogonal code, and a QPSK spreader for PN-spreading the orthogonally spread signal with a PN code. In the demodulation method, a mobile station receives the PN-spread signal from the base station, PN-despreads the received signal with a PN code by a QPSK despreader, and orthogonally despreads the PN-despread signal with the assigned orthogonal code by a BPSK despreader. In both aspects, during the orthogonal despreading, the complex conjugate of the estimated pilot channel value is multiplied by the orthogonally despread signal, for compensation.

4 Claims, 8 Drawing Sheets

CHANNEL SPREADING DEVICE AND METHOD IN CDMA COMMUNICATION SYSTEM

PRIORITY

This application claims priority to an application entitled "Channel Spreading Device and Method in CDMA Communication System" filed in the Korean Industrial Property Office on Dec. 8, 1998 and assigned Serial No. 98-54296, the contents of which are hereby incorporated by reference.

BACKGROUND OF THE INVENTION

1. Field of the Invention

The present invention relates generally to a channel spreading device and method in a CDMA (Code Division Multiple Access) communication system, and in particular, to a device and method for spreading a channel signal using a Walsh code.

2. Description of the Related Art

As one way to increase system capacity in a CDMA communication system, channelization is provided by use of orthogonal codes. The orthogonal codes can be Walsh codes. The orthogonal channelization is applied to a forward link in the IS-95 standard, for example. A reverse link can be orthogonally channelized by time alignment.

Orthogonal channelization is provided to the forward link in an IS-95 communication system. In FIG. 1, W0–W63 denotes orthogonal codes and each channel is distinguished by its assigned orthogonal code. The orthogonal codes W0–W63 can be Walsh codes. Each channel on the IS-95 forward link is convolutionally encoded and a modulator performs BPSK (Bi-Phase Shift Keying) modulation. The bandwidth used is 1.2288 MHz and the data rate is 9.6 kbps in the IS-95 communication system. Thus, 64 channels (=1.2288 M/(9.6 k×2)) on an IS-95/IS-95A forward link are distinguished by the 64 orthogonal codes W0–W63, as shown in FIG. 1.

The number of available orthogonal codes is obtained after the modulation scheme and the minimum data rate is determined. Future CDMA communication systems will improve system performance by increasing the number of channels available to users.

However, the above IS-95 scheme limits the number of available channels, due to the limited number of Walsh codes available. Consequently, the capacity of channels available to users is limited. It is preferable to use a variable data rate and quasi-orthogonal codes due to their minimal interference with orthogonal codes.

The structure and generation of the quasi-orthogonal codes is disclosed in detail in Korea Application No. 97-47457. The application is for BPSK modulation and sequences have a correlation value of $2^{m+1}(>\sqrt{L})$ for an odd power of length 2, $L=2^{2m+1}$. A complex quasi-orthogonal function for QPSK (Quadrature Phase Shift Keying) modulation is described in detail in Korea Application No. 98-37453. The complex quasi-orthogonal function is excellent in terms of a correlation value since a correlation value is given $\sqrt{L}$ for $L=2^{2m+1}$, thereby overcoming the correlation value-related problem of quasi-orthogonal functions in BPSK modulation.

In IMT-2000 systems, QPSK modulation is implemented to utilize the above complex quasi-orthogonal function. The resulting QPSK modulation of Walsh codes makes it impossible to achieve backward compatibility between an IMT-2000 system and an existing IS-95 system that employs BPSK modulation to spread specific common channels such as a pilot channel or a sync channel.

The incompatibility between the conventional IS-95 CDMA communication system and the IMT-2000 CDMA communication system will be described in detail. In the following description, the orthogonal code index k, which is applied to the orthogonal code spreader/despreader, is an index used for generating a specific Walsh code and thus the orthogonal code spreader/despreader is a Walsh code modulator/demodulator.

FIG. 2 is a block diagram of a spreading device in a base station using QPSK modulation according to a preferred embodiment of the present invention.

Referring to FIG. 2, after channel encoding, rate matching, and interleaving, odd data $a_I$ and even data $a_Q$ are applied to the input of signal mappers 211 and 213, respectively. The signal mapper 211 converts 0s and 1s of the odd data $a_I$ to +1s and –1s, respectively, and outputs the converted data as $d_I$. The signal mapper 213 converts 0s and 1s of the even data $a_Q$ to +1s and –1s, respectively and outputs the converted data as $d_Q$. An orthogonal code spreader 215 receives the signals $d_I$ and $d_Q$ from the signal mappers 211 and 213 and an orthogonal code index k, multiplies the signals $d_I$ and $d_Q$ by the Walsh code $W_k$ corresponding to the orthogonal code index k, and outputs signals $X_I$ and $X_Q$ $[X_I+jX_Q=(d_I+jd_Q)*(W_k+jW_k)]$.

A PN code generator 217 generates PN codes $PN_I$ and $PN_Q$ for spectrum-spreading the orthogonally spread signals $X_I$ and $X_Q$. Here, the PN codes can be short PN sequences. A PN masking portion 219 generates spread spectrum signals $Y_I$ and $Y_Q$ by multiplying the orthogonally spread signals $X_I$ and $X_Q$ by their corresponding PN codes $PN_I$ and $PN_Q$ $[Y_I+jY_Q=(PN_I+jPN_Q)*(X_I+jX_Q)]$. Baseband filters 221 and 223 baseband-pass-filter the spread spectrum signals $Y_I$ and $Y_Q$, respectively. A mixer 225 converts the output of the baseband filter 221 to an RF signal by multiplying it by a carrier $\cos 2\pi f_c t$ and a mixer 227 converts the output of the baseband filter 223 to an RF signal by multiplying it by a carrier $\sin 2\pi f_c t$. An adder 229 sums the outputs of the mixers 225 and 227 and outputs the sum as a transmission signal.

As shown in FIG. 2, the signal mappers 211 and 213 convert the signals $a_I$ and $a_Q$ having 0s and 1s to the signals $d_I$ and $d_Q$ having 1s and –1s, respectively. The orthogonal code spreader 215 receives the orthogonal code index k as well as the signals $d_I$ and $d_Q$ to orthogonally spread the signals $d_I$ and $d_Q$. The signals $d_I$ and $d_Q$ can be expressed as a complex number $d_I+jd_Q$, which is complex multiplied by the Walsh code in its complex form $W_k+jW_k$. This multiplication, which results in $X_I+jX_Q(=(d_I+jd_Q)*(W_k+jW_k))$, occurs N times (N is the number of chips in the Walsh code).

FIG. 3 is a block diagram of a mobile station receiver for receiving and demodulating a signal from the base station transmitter shown in FIG. 2 according to a preferred embodiment of the present invention.

Referring to FIG. 3, a mixer 311 mixes a received signal with the carrier $\cos 2\pi f_c t$ and a mixer 313 mixes the received signal with the carrier $\sin 2\pi f_c t$. Baseband filters 315 and 317 baseband-pass-filter the outputs of the mixers 311 and 313.

A PN code generator 318 generates the PN codes $PN_I$ and $PN_Q$ for despreading the received signal. A PN masking portion 319 generates the despread signals $X_I$ and $X_Q$ by multiplying the signals $Y_I$ and $Y_Q$ received from the baseband filters 315 and 317 by the complex conjugate of PN codes $PN_I$ and $PN_Q$ [$X_I+jX_Q=(PN_I-jPN_Q)*(Y_I+jY_Q)$]. An orthogonal code despreader 321 receives the despread signals $X_I$ and $X_Q$ and the orthogonal code index k and generates the despread channel signals $d_I$ and $d_Q$ by multiplying the signals $X_I$ and $X_Q$ by the complex conjugate of the orthogonal code $W_k$ corresponding to orthogonal code index k [$2*(d_I+jd_Q)=\Sigma(X_I+jX_Q)*(W_k-jW_k)$]. A signal mapper 323 converts +1s and −1s of the signal $d_I$ received from the orthogonal code despreader 321 to 0s and 1s, respectively. A signal mapper 325 converts +1s and −1s of the signal $d_Q$ received from the orthogonal code despreader 321 to 0s and 1s, respectively. The output signals of the signal mappers 323 and 325 are applied to a combiner (not shown) for use as a channel estimation signal.

In FIG. 3, the PN masking portion 319 and the orthogonal code despreader 321 form a single finger. To estimate channels, the mobile station receiver is provided with a plurality of such fingers.

In the despreading operation of the mobile station, the signals $X_I$ and $X_Q$ output from the PN masking portion 319 and then the orthogonal code index k are applied to the input of the orthogonal code despreader 321. Here, the orthogonal code index k is known to both the mobile station and the base station. The signals $X_I$ and $X_Q$ can be represented as the complex number $X_I+jX_Q$, which is multiplied by the complex conjugate $W_k-j\bar{W}_k$ of the orthogonal code $W_k$ expressed as the complex number $W_k+jW_k$. Calculated values obtained by performing this operation N times are accumulated to a value twice as great as the input value in the modulation operation of FIG. 2. Therefore, the despreader outputs the accumulated value. If N is 1 in the demodulation, the relation between an input and an output is $$\tfrac{1}{2}(d_I+jd_Q)(W_k-jW_k)=\tfrac{1}{2}(d_I+jd_Q)(W_k+jW_k)(W_k-jW_k)=(d_I+jd_Q) \quad (1)$$

FIG. 4 is a block diagram of a base station spreading device using an orthogonal code and BPSK modulation in a CDMA mobile communication system. The spreading device of FIG. 4 is the same as that of FIG. 2 in configuration, except for an orthogonal code spreader 400, the signal mapper 211, and the PN masking portion 219. The orthogonal code spreader 400 spreads a channel signal in BPSK.

Referring to FIG. 4, an input signal a having 0s and 1s is applied to the input of the signal mapper 211 and converted to a signal d having 1s and −1s. The orthogonal code spreader 400 receives signal d and orthogonal code index k for orthogonal spreading and outputs $d*W_k$ N times.

FIG. 5 is a block diagram of a mobile station receiver for receiving and modulating a spread signal from the base station transmitter shown in FIG. 4. The mobile station receiver of FIG. 5 is the same as that of FIG. 3 in configuration, except for an orthogonal code despreader 500 which performs channel despreading in BPSK.

Referring to FIG. 5, the orthogonal code despreader 500 receives signal X from the PN masking portion 319 and the orthogonal code index k. The orthogonal code index k is known to both the mobile station and the base station. The signal X is multiplied by the Walsh code $W_k$ used in the base station. Calculated values obtained by performing this operation N times are accumulated to a value twice as great as the input value in the modulation operation of FIG. 4. Therefore, the orthogonal code despreader 500 outputs the accumulated value. If N is 1 in the demodulation, the relation between an input and an output is $$\tfrac{1}{2}(d_I+jd_Q)W_k=\tfrac{1}{2}(d_I+jd_Q)W_kW_k=(d_I+jd_Q) \quad (2)$$

The IS-95 system employs a BPSK orthogonal spreading scheme, whereas the IMT-2000 system may use a QPSK orthogonal spreading scheme. In this case, it is impossible to conduct communications between a base station of the IMT-2000 system and a mobile station of the IS-95 system and between a base station of the IS-95 system and a mobile station of the IMT-2000 system.

In order to describe the problem, it is assumed that the base station in the IMT-2000 system subjects a signal to QPSK modulation and the mobile station in the IS-95 system subjects a modulated signal to BPSK demodulation. Therefore, when the base station transmits a QPSK modulation signal modulated as shown in FIG. 2 and the mobile station despreads a spread channel signal in BPSK as shown in FIG. 5, the relation between an input value and an output value of the demodulator is $$\tfrac{1}{2}(X_I+jX_Q)W_k=\tfrac{1}{2}(d_I+jd_Q)(W_k+jW_k)W_k=(d_I-jd_Q)+j(d_I+jd_Q) \quad (3)$$

It is noted from Eq. 3 that not the original signal $S_I+jS_Q$, but $(d_I-jd_Q)+j(d_I+jd_Q)$ is output from the demodulator on the above assumption. Due to the difference between BPSK modulation input and QPSK demodulation output, the base station cannot communicate with the mobile station. This also applies to the reverse case where the base station spreads a channel signal in BPSK and the mobile station demodulates a BPSK modulation signal in QPSK.

To solve this problem, Korea Application No. 98-49863 suggests a base station transmitter for IMT-2000 which can perform both BPSK and QPSK orthogonal spreading. The base station transmitter spreads a common channel signal (pilot channel, sync channel, and paging channel) used in an IS-95 base station in BPSK modulation and the other channels (dedicated channels) in BPSK or QPSK depending on the reception scheme of a mobile station communicating with the base station. In contrast, the present invention applies one QPSK orthogonal modulation scheme to all forward channels, while achieving compatibility with a conventional IS-95 mobile station using a BPSK reception scheme.

SUMMARY OF THE INVENTION

An object of the present invention, therefore, is to provide a channel signal transmitting/receiving device having a QPSK channel spreader and a BPSK receiver and a method thereof in a CDMA communication system.

Another object of the present invention is to provide a channel signal transmitting/receiving device having a BPSK channel. spreader and a QPSK receiver and a method thereof in a CDMA communication system.

A further object of the present invention is to provide a device and method for enabling a base station to transmit a QPSK spread channel signal and a mobile station to despread the QPSK spread channel signal by use of a BPSK channel despreader in a CDMA communication system.

Still another object of the present invention is to provide a device and method for enabling a base station to transmit a BPSK spread channel signal and a mobile station to despread the. BPSK spread channel signal by use of a QPSK channel despreader in a CDMA communication system.

These and other objects are achieved by providing a demodulation method in a mobile station having a plurality of channels, for receiving a signal from a base station. In a first embodiment of the present invention, the base station has a plurality of channels, a BPSK spreader for orthogonally spreading symbol data of each channel with an assigned orthogonal code, and a QPSK spreader for PN-spreading the orthogonally spread signal with a PN code. In the demodulation method, a first QPSK despreader in the mobile station receives PN-spread signal and PN-despreads the PN-spread signal with the PN code, and a second QPSK despreader orthogonally despreads the PN-despread signal with a complex orthogonal code having the real and imaginary parts of the assigned orthogonal code. During the orthogonal despreading, the complex conjugate of the estimated pilot channel value is multiplied by the orthogonally despread signal, for compensation.

In a second embodiment of the present invention, the base station has a plurality of channels, and is comprised of a QPSK spreader for spreading symbol data of each channel by the real and imaginary parts of its assigned orthogonal code, and a QPSK spreader for PN-spreading the orthogonally spread signal with a PN code. In the demodulation method, a mobile station receives the PN-spread signal from the base station, PN-despreads the received signal with a PN code by a QPSK despreader, and orthogonally despreads the PN-despread signal with the assigned orthogonal code by a BPSK despreader. During the orthogonal despreading, the complex conjugate of the estimated pilot channel value is multiplied by the orthogonally despread signal, for compensation.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

For comprehensive understanding of the present invention, a description will be given of an IS-95 system using a BPSK modulation scheme for orthogonal spreading, IS-95 mobile station, an IMT-2000 system using a QPSK modulation scheme, and channels for IMT-2000 mobile stations. However, these are mere exemplary applications and thus it is obvious that many variations can be made by those having ordinary skill in the art.

In the following description, "orthogonal spreading" and "channel spreading" have the same meaning, and "PN spreading" and "spectrum spreading" also have the same meaning. Walsh codes are used as orthogonal codes for the QPSK/BPSK orthogonal spreader and despreader in the preferred embodiment of the present invention.

It is assumed in the preferred embodiment of the present invention that the IMT-2000 system and its mobile station have a QPSK channel spreading/despreading structure and the IS-95 system and its mobile station have a BPSK channel spreading/despreading structure. A description will be given of spreading and despreading in an IMT-2000 base station having a QPSK channel spreading scheme and an IS-95 mobile station having a BPSK channel spreading scheme; and spreading and despreading in an IMT-2000 mobile station having a QPSK channel spreading scheme and an IS-95 base station having a BPSK channel spreading scheme.

Figure 4:
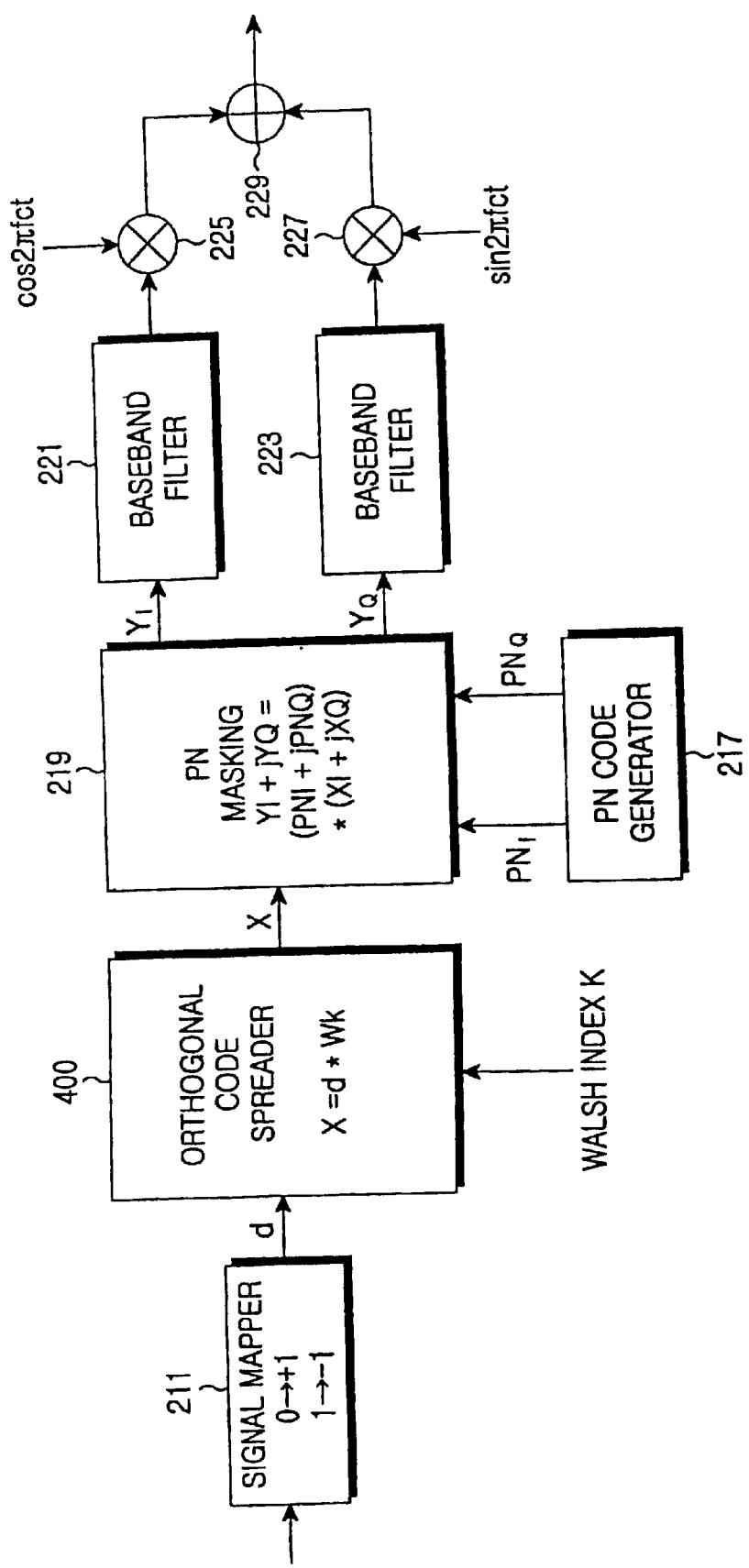
FIG. 4 is a block diagram of a base station modulating device in an IS-95 communication system.
Figure 5:
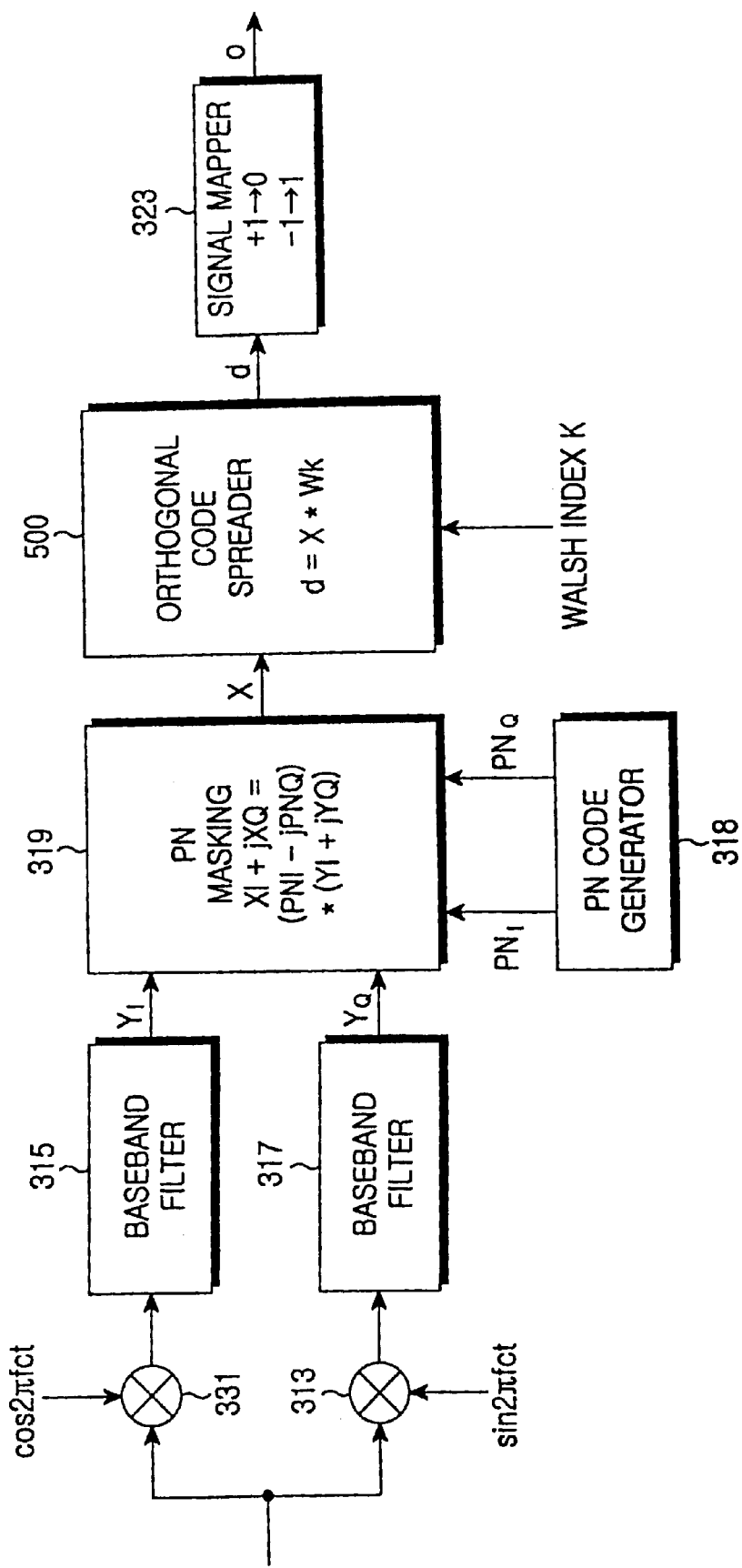
FIG. 5 is a block diagram of a mobile station demodulating device in an IS-95 communication system.
Figure 6:
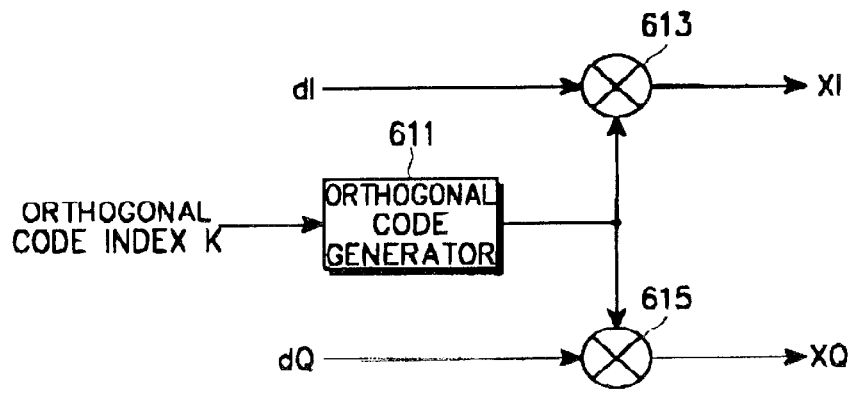
FIG. 6 is a block diagram of a BPSK spreader for a modulating device in a CDMA communication system.

FIG. 4 is a block diagram of a spreading device in the BPSK mode and FIG. 6 is a block diagram of the orthogonal code spreader 400 shown in FIG. 4.

Referring to FIG. 6, an orthogonal code generator 611 includes an orthogonal code table and generates an orthogonal code corresponding to an input orthogonal code index. A multiplier 613 generates an orthogonally spread I channel signal $X_I$ by multiplying the input signal $d_I$ by the generated orthogonal code. A multiplier 615 generates an orthogonally spread Q channel signal $X_Q$ by multiplying the input signal $d_Q$ by the generated orthogonal code.

In operation, the input signals $d_I$ and $d_Q$ are applied to the multipliers 613 and 615, respectively. For the input of the orthogonal code index k, an orthogonal code generator 611 generates an orthogonal code corresponding to the orthogonal code index k and feeds the orthogonal code to the multipliers 613 and 615. The multiplier 613 generates the signal $X_I$ by multiplying the input signal $d_I$ by the orthogonal code. The multiplier 615 generates the signal $X_Q$ by multiplying the input signal $d_Q$ by the orthogonal code.

Figure 1:
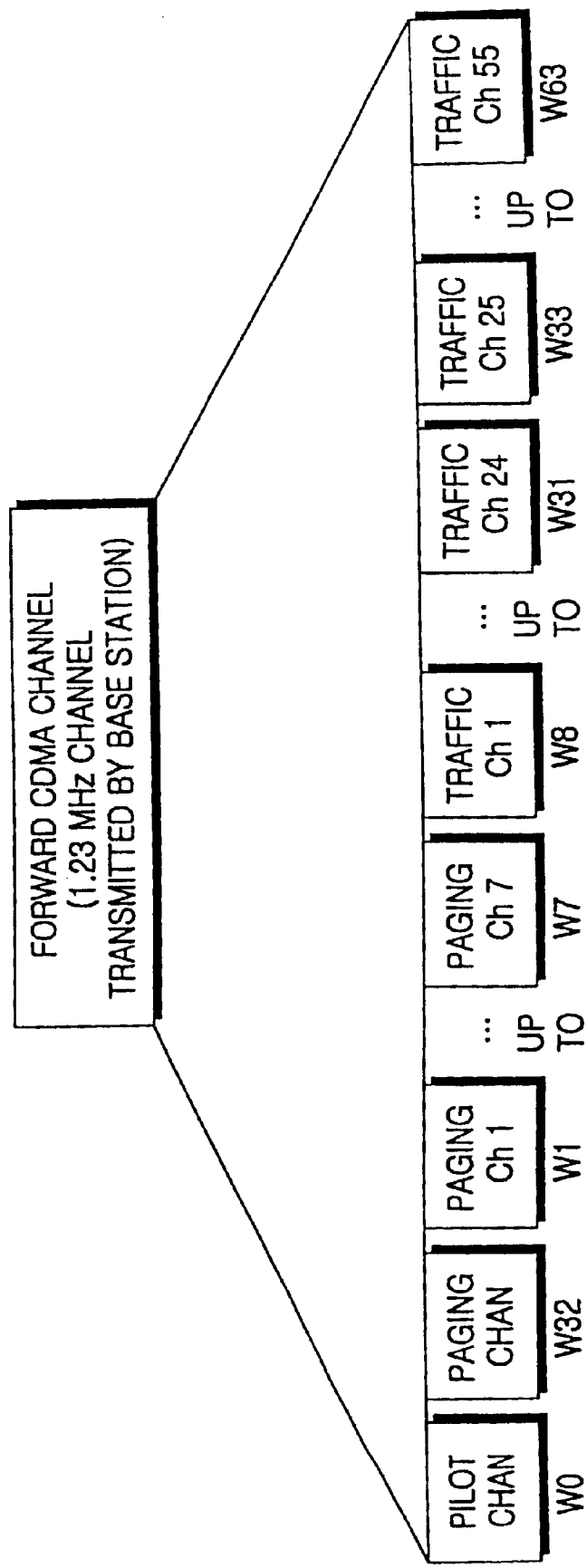
FIG. 1 illustrates the structure of forward link channels in a IS-95 CDMA communication system.
Figure 2:
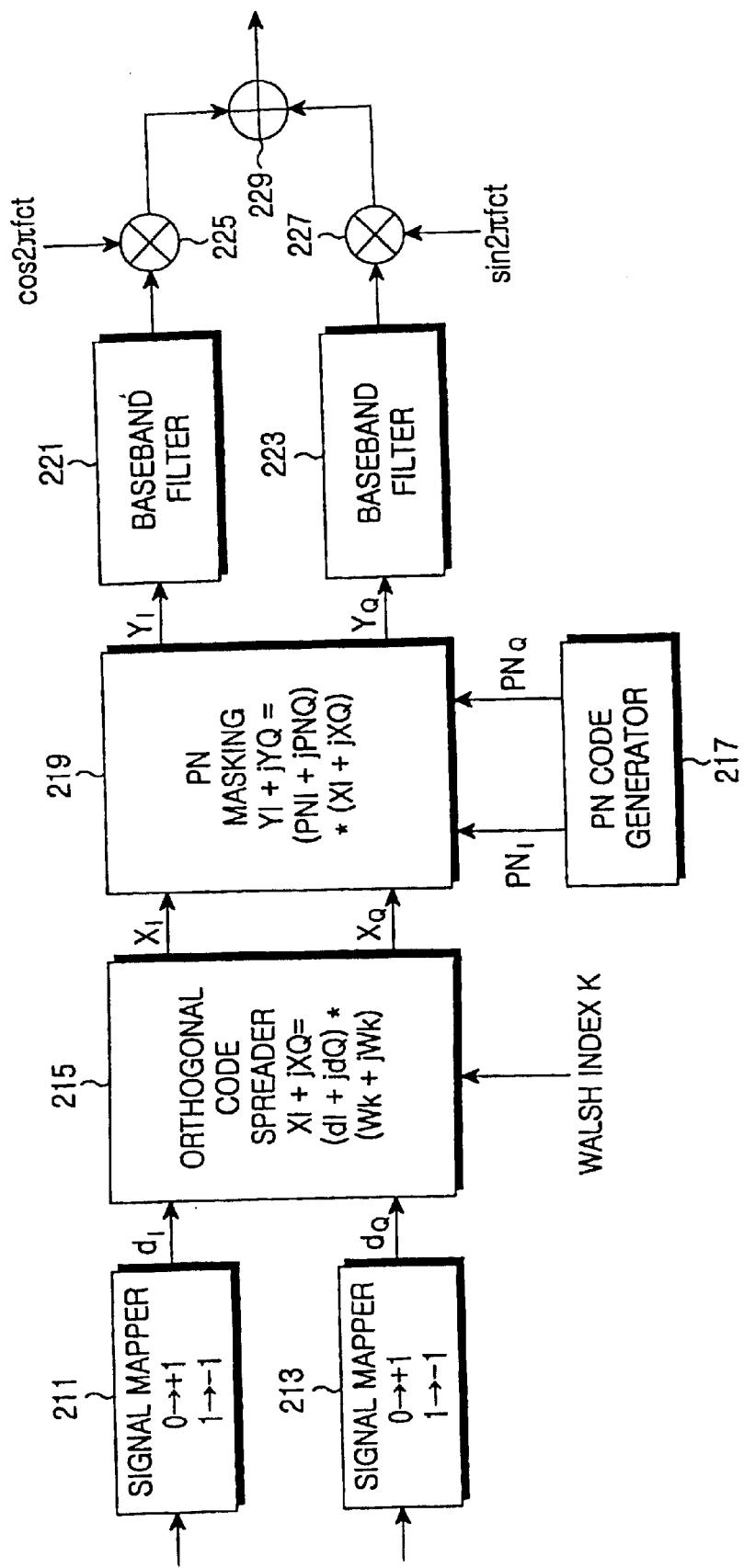
FIG. 2 is a block diagram of a base station modulating device in a CDMA communication system according to an embodiment of the present invention.
Figure 7:
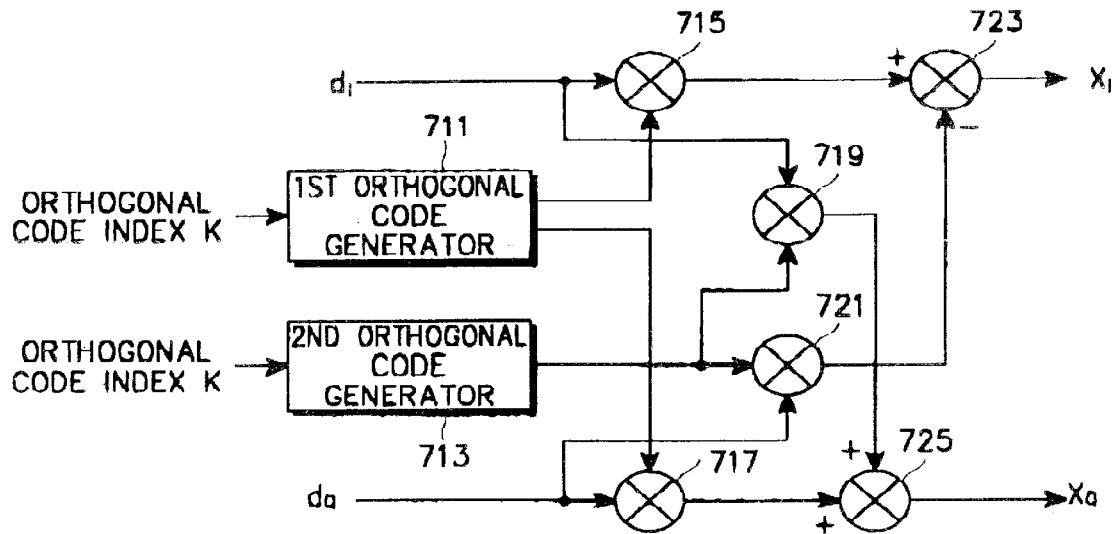
FIG. 7 is a block diagram of a QPSK spreader for a modulating device in a CDMA communication system.

FIG. 2 is a block diagram of a transmitting device in the QPSK mode, and FIG. 7 is a block diagram of the orthogonal code spreader 215 in the QPSK transmitting device shown in FIG. 2.

Referring to FIG. 7, for the input of the orthogonal code index k, first and second orthogonal code generators 711 and 713 generate first and second orthogonal codes corresponding to the orthogonal code index k. The first and second orthogonal codes are I-channel and Q-channel orthogonal codes, respectively. A multiplier 715 multiplies the input signal di by the first orthogonal code received from the first orthogonal code generator 711. A multiplier 717 multiplies the input signal $d_Q$ by the first orthogonal code received from the first orthogonal code generator 711. A multiplier 719 multiplies the input signal $d_I$ by the second orthogonal code received from the second orthogonal code generator 713. A multiplier 721 multiplies the input signal $d_Q$ by the second orthogonal code received from the second orthogonal code generator 713. A subtracter 723 subtracts the output of the multiplier 721 from the multiplier 715 and outputs the signal $X_I$. An adder 725 adds the outputs of the multipliers 717 and 719 and outputs the signal $X_Q$.

In operation, the signal $d_I$ is applied to the multipliers 715 and 719, and the signal $d_Q$ to the multipliers 717 and 721.

Simultaneously, the I-channel orthogonal code generator 711 and the Q-channel orthogonal code generator 713 receive the orthogonal code index k and generate the I-channel and Q-channel orthogonal codes corresponding to the index k. The generated orthogonal codes can be Walsh codes and in this case, the I-channel orthogonal code and the Q-channel orthogonal code can be $W_k$ and $jW_k$, respectively. The I-channel orthogonal code is applied to the multipliers 715 and 717. The multiplier 715 multiplies the I-channel signal $d_I$ by the I-channel orthogonal code and the multiplier 717 multiplies the Q-channel signal do by the I-channel orthogonal code. The Q-channel orthogonal code is applied to the multipliers 719 and 721. The multiplier 719 multiplies the I-channel signal $d_I$ by the Q-channel orthogonal code and the multiplier 721 multiplies the Q-channel signal $d_Q$ by the Q-channel orthogonal code. The subtracter 723 subtracts the output of the multiplier 721 from the output of the multiplier 715 and generates the signal $X_I$. The adder 725 adds the outputs of the multipliers 717 and 719 and generates the signal $X_Q$.

Figure 3:
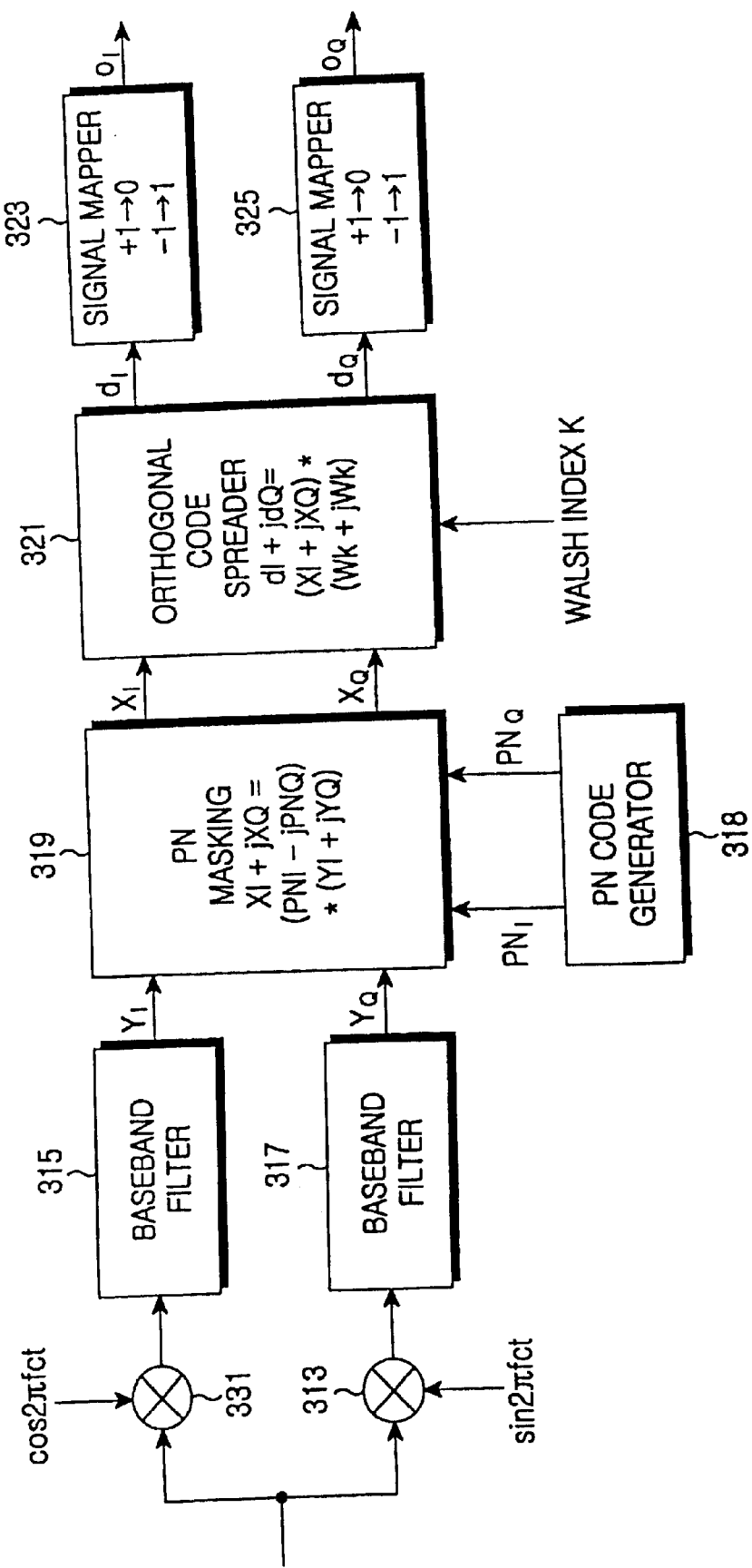
FIG. 3 is a block diagram of a mobile station demodulating device in the CDMA communication system according to an embodiment of the present invention.
Figure 10:
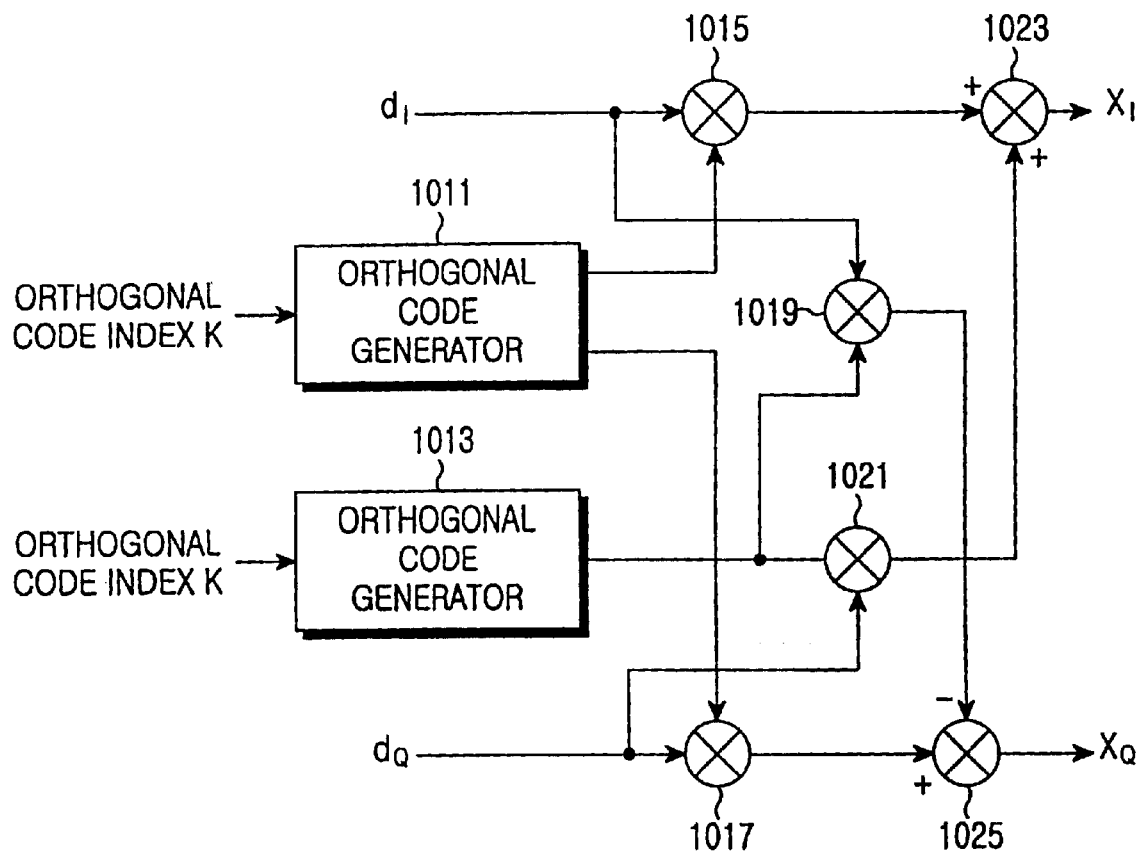
FIG. 10 illustrates a despreading structure according to an embodiment of the present invention.

FIG. 10 is a block diagram of the orthogonal code despreader 321 in the QPSK receiver shown in FIG. 3. The orthogonal code despreader 321 is the same in configuration and operation as the orthogonal code spreader 215, except for a subtracter 1025 and an adder 1023. Referring to FIG. 10, for the input of the orthogonal code index k, first and second orthogonal code generators 1011 and 1013 generate first and second orthogonal codes corresponding to the orthogonal code index k. The first and second orthogonal codes are I-channel and Q-channel orthogonal codes, respectively. Here, the generated orthogonal codes can be Walsh codes and in this case, the I-channel orthogonal code and the Q-channel orthogonal code can be $W_k$ and $jW_k$, respectively. A multiplier 1015 multiplies the input signal $X_I$ by the first orthogonal code received from the first orthogonal code generator 1011. A multiplier 1017 multiplies the input signal $X_Q$ by the first orthogonal code received from the first orthogonal code generator 1011. The QPSK orthogonal code despreader is the same as a BPSK orthogonal code despreader in that the first orthogonal code generator 1011, the multiplier 1015, and the multiplier 1017 are included as components. A multiplier 1019 multiplies the input signal $X_I$ by the second orthogonal code received from the second orthogonal code generator 1013. A multiplier 1021 multiplies the input signal $X_Q$ by the second orthogonal code received from the second orthogonal code generator 1013. An adder 1023 adds the outputs of the multiplier 1015 and the multiplier 1021 and outputs the signal $d_I$. A subtracter 1025 subtracts the output of the multipliers 1019 from the output of the multiplier 1017 and outputs the signal $d_Q$.

Figure 8:
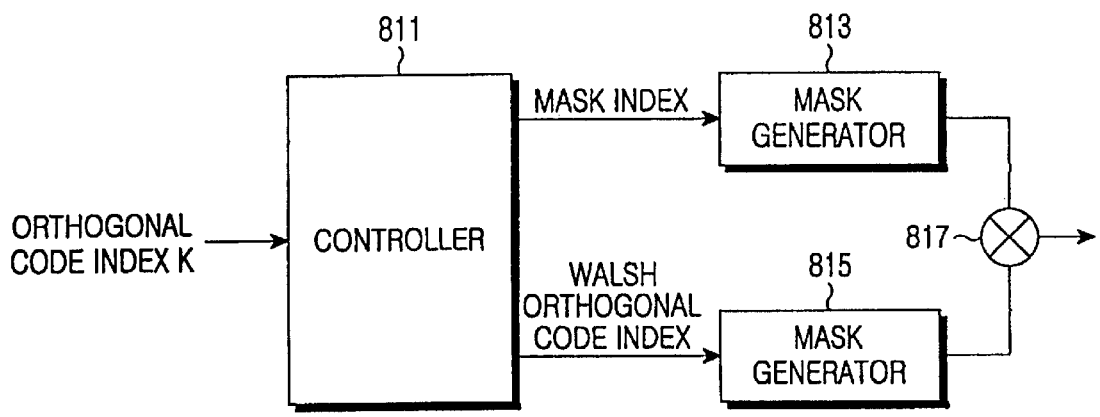
FIG. 8 is a block diagram of an orthogonal code generator according to an embodiment of the present invention.

FIG. 8 is a block diagram of an embodiment of an orthogonal code generator for the orthogonal code spreaders 611, 711, and 713, as shown in FIGS. 6 and 7. The orthogonal code generator of FIG. 8 is configured to generate a Walsh code and a quasi-orthogonal code and generates the two codes in accordance with an embodiment of the present invention.

Referring to FIG. 8, a controller 811 receives the orthogonal code index k and calculates a quasi-orthogonal code mask index and a Walsh code index to generate a quasi-orthogonal code corresponding to the orthogonal code index k. A quasi-orthogonal code mask generator 813 has a mask index table and selects a quasi-orthogonal code mask corresponding to the quasi-orthogonal code mask index from the table. A Walsh code generator 815 has a Walsh code table and generates a Walsh code corresponding to the Walsh code index referring to the table. A multiplier 817 multiples the quasi-orthogonal code mask by the Walsh code, thereby generating an orthogonal code. If the quasi-orthogonal code mask index is not selected, the quasi-orthogonal code mask generator 813 does not generate the quasi-orthogonal code mask. Therefore, the multiplier 817 outputs the Walsh code received from the Walsh code generator 815 as the orthogonal code. If the quasi-orthogonal code mask generator 813 outputs a quasi-orthogonal code mask, the multiplier 817 outputs the quasi-orthogonal code as the orthogonal code output.

In operation, for the input of the orthogonal code index k, the controller 811 calculates the quasi-orthogonal code mask index and the Walsh code index corresponding to the orthogonal code index k. If the orthogonal code index k is for generating a Walsh code, the controller 811 outputs a predetermined value as the quasi-orthogonal code mask index and an intended Walsh code index value as the Walsh code index. Whether generating a Walsh or quasi-orthogonal code, the quasi-orthogonal code mask index is applied to the mask generator 813 and the Walsh code index to the Walsh code generator 815. The quasi-orthogonal code mask generator 813 generates a corresponding quasi-orthogonal code mask signal expressed as 1s and −1s, and the Walsh code generator 817 generates a corresponding Walsh code having 1s and −1s. The multiplier 817 multiplies the quasi-orthogonal code mask by the Walsh code, and outputs the orthogonal code.

Figure 9:
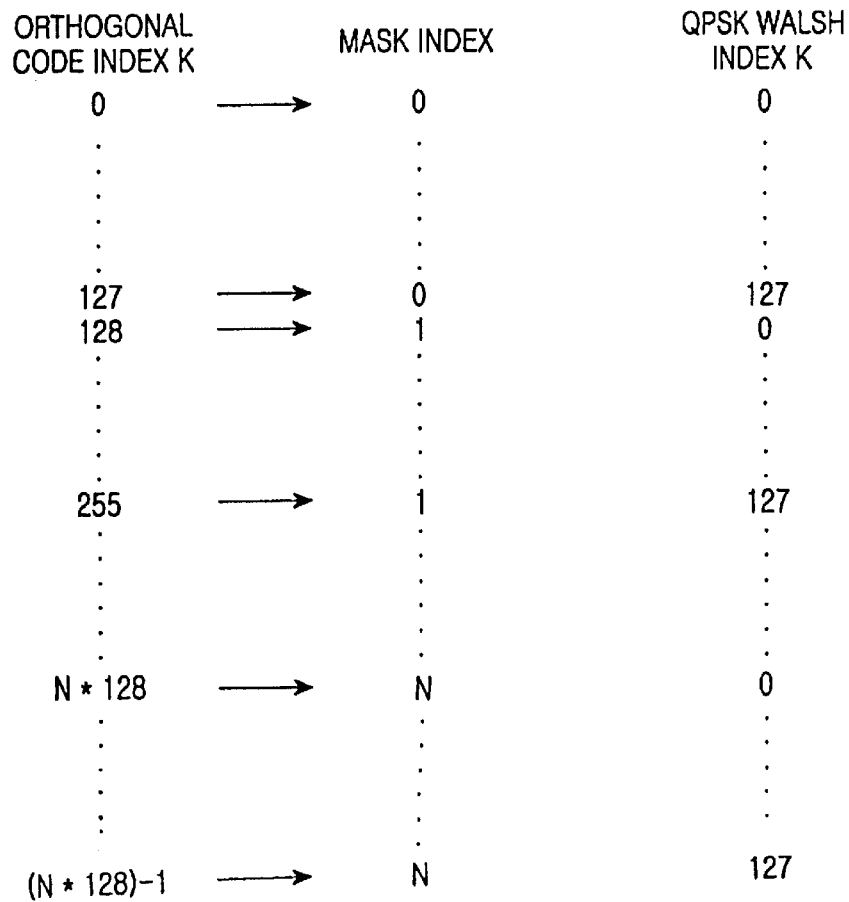
FIG. 9 illustrates an example of orthogonal code indexes according to an embodiment of the present invention.

FIG. 9 illustrates a quasi-orthogonal code mask index table and a Walsh code index table corresponding to the orthogonal code index k in the orthogonal code generator of FIG. 8.

For generation of a Walsh code in the orthogonal code generator constituted as shown in FIG. 8, the quasi-orthogonal code index is set to a predetermined value, such as 0 (this can be changed as a system variable). When the quasi-orthogonal code mask generator 813 receives this predetermined value, it outputs all 1s. Thus, the Walsh code generator 815 generates a Walsh code corresponding to the Walsh code index and the multiplier 817 outputs the Walsh code as the orthogonal code.

For generation of a quasi-orthogonal code in the orthogonal code generator constituted as shown in FIG. 8, the controller 811 receives the orthogonal code index k and calculates a quasi-orthogonal code mask index and a Walsh code index in order to generate the quasi-orthogonal code corresponding to the orthogonal code index k. The quasi-orthogonal code mask generator 813 selects a quasi-orthogonal code mask corresponding to the quasi-orthogonal code mask index from the table shown in FIG. 9. The Walsh code generator 815 generates a Walsh code corresponding to the Walsh code index. Then, the multiplier 817 multiples the quasi-orthogonal code mask by the Walsh code, thereby generating a quasi-orthogonal code.

A. Transmission/reception Between an IMT-2000 Mobile Station and an IS-95 Base Station The CDMA communication system according to a first embodiment of the present invention suggests a channel structure in which all channels in the IMT-2000 mobile station are despread in a QPSK modulation scheme on the assumption that the IS-95 base station has channels which are spread in a BPSK modulation scheme.

An output value from the BPSK modulation in an IS-95 base station is calculated by $$d_I W_k (PN_I + jPN_Q) \tag{4}$$

To transmit a channel signal orthogonally spread by BPSK, the base station controls the gain of each channel signal based on a pilot channel signal. A mobile station receiver estimates the pilot channel signal and demodulates received channel signals. All information bits of the pilot signal can be 0s in the case that bits are expressed as 0s or 1s, or +1 in the case that bits are expressed as −1s or +1s, and a Walsh code #0 having all 0s is used for the pilot channel. The base station PN-spreads each channel signal by QPSK and transmits the spread channel signal to all mobile stations within the cell radius of the base station. When an IMT-2000 mobile station, which despreads a pilot signal by QPSK, receives the signal from the IS-95 base station, it locates a sequence $PN_I+jPN_Q$ through a searcher since it knows information bits $d_I$ and a Walsh code $W_k$ of the pilot signal. When the sequence $PN_I+jPN_Q$ is searched for, its complex conjugate $PN_I-jPN_Q$ is multiplied by the received pilot signal. Since an IMT-2000 mobile station performs QPSK demodulation, it multiplies the pilot signal by the complex conjugate $W_k-jW_k$ of the complex Walsh code $W_k+jW_k$ corresponding to the orthogonal code index k. Since the data is 1s all the time (when expressed as +1s and −1s), the IMT-2000 mobile station considers the signal resulting from the above procedure as a channel estimation value, which is given by:

$$d_I+W_k(PN_I+jPN_Q)(ch_I+jch_Q)(PN_I-jPN_Q)(W_k-jW_k)=c(1-j)(ch_I+jch_Q) \quad (5)$$

where $ch_I+jch_Q$ is a channel value (changed on the channel after modulation) and c is a constant. As stated above, the IMT-2000 mobile station calculates this channel estimation value from the pilot signal in Eq. 5. Upon receipt of a different channel signal (e.g., traffic channel signal) as in Eq. 4, the complex conjugate of the channel estimation value, which is calculated from the pilot signal (using Eq. 5) before demodulation, is multiplied by the received different channel signal, which is $$d_I W_k(PN_I+jPN_Q)(ch_I+jch_Q)(ch_I+jch_Q)1/c(1+j)(ch_I-jch_Q) \quad (6)$$

Consequently, the channel value is compensated. That is, the different channel signal propagated in the same path as the pilot signal is compensated with the channel estimation value obtained in Eq. 5. Similarly to the demodulation of the pilot signal, the original data $d_I$ can be obtained by multiplying the pilot signal by the complex conjugate $PN_I-jPN_Q$ of $PN_I+jPN_Q$ and then the complex orthogonal code $W_k+jW_k$.

$$d_I W_k(PN_I+jPN_Q)(ch_I+jch_Q)1/c(1+j)(ch_I-jch_Q) \quad (7)$$

It is noted from the above procedure that an IMT-2000 mobile station that has a QPSK despreading structure for all channels can compatibly communicate with an IS-95 base station that has a BPSK spreading structure.

Therefore, the base station has a plurality of channels, and is comprised of a BPSK spreader for spreading symbol data of each channel by its assigned Walsh code, and a QPSK spreader for PN-spreading the orthogonally spread signal with a PN code. Then, a mobile station, which has a plurality of channels, receives the PN-spread signal from the base station, PN-despreads the received signal with a PN code by a QPSK despreader, and orthogonally despreads the PN-despread signal with a complex orthogonal code having the real part and imaginary part of the assigned orthogonal code by a QPSK despreader. During the orthogonal despreading, the complex conjugate of the estimated pilot channel value is multiplied by the orthogonally despread signal, for compensation.

B. Transmission/reception Between an IMT-2000 Base Station and an IS-95 Mobile Station The CDMA communication system according to a second embodiment of the present invention suggests a channel structure in which all channels in the IMT-2000 base station are spread in a QPSK modulation scheme on the assumption that the IS-95 mobile station has channels which are spread in a BPSK modulation scheme.

An output value from the modulation based on QPSK spreading in the IMT-2000 base station is calculated by $$d_I W_k(W_k+jW_k)(PN_I+jPN_Q) \quad (8)$$

To transmit a channel signal orthogonally spread by QPSK, the base station controls the gain of each channel signal based on a pilot channel signal. A receiver in the mobile station estimates the pilot channel signal and demodulates received channel signals. All information bits of the pilot signal can be 0s in the case that bits are expressed as 0s or 1s, or +1 in the case that bits are expressed as −1 or +1s or 1s (0→1, 1→−1), and a Walsh code #0 having all 0s is used for the pilot channel. The base station orthogonally spreads each channel signal by QPSK and transmits the spread channel signal to all mobile stations within the cell radius of the base station. When an IS-95 mobile station receives the signal from the IMT-2000 base station, it locates a sequence $PN_I+jPN_Q$ through a searcher since it knows information bits $d_I$ and a Walsh code $W_k$ of the pilot signal. When the sequence $PN_I+jPN_Q$ is searched for, its complex conjugate $PN_I-jPN_Q$ is multiplied by the received pilot signal. Since the IS-95 mobile station performs BPSK demodulation, it multiplies the pilot signal by the Walsh code $W_k$ corresponding to the orthogonal code index k. Since the data is 1s all the time (when expressed as −1s and +1s), the IS-95 mobile station considers the signal resulting from the above procedure as a channel estimation value, which is given by $$d_I(W_k+jW_k)(PN_I+jPN_Q)(ch_I+jch_Q)(PN_I-jPN_Q)W_k=c(1+j)(ch_I+jch_Q) \quad (9)$$

where c is a constant.

In Eq. 9, the IS-95 mobile station calculates a channel estimation value from the pilot signal. Upon receipt of a different channel signal as in Eq. 8, the complex conjugate of the channel estimation value, which is calculated from the pilot signal (using Eq. 9) before demodulation, is multiplied by the received different channel signal, which is $$d_I(W_k+jW_k)(PN_I+jPN_Q)(ch_I-jch_Q)1/c(1-j)(ch_I-jch_Q) \quad (10)$$

Similarly to the demodulation of the pilot signal, the original data $d_I$ can be obtained by multiplying the pilot signal by the complex conjugate $PN_I-jPN_Q$ of $PN_I+jPN_Q$, and then the orthogonal code $W_k$.

$$d_I(W_k+jW_k)(PN_I+jPN_Q)(ch_I+jch_Q)1/c(1-j)(ch_I-jch_Q)(PN_I-jPN_Q)W_k=d_I \quad (11)$$

It is noted from the above procedure that an IMT-2000 base station having a QPSK spreading structure for all channels can compatibly communicate with an IS-95 mobile station having a BPSK despreading structure.

As described above, the base station has a plurality of channels, and is comprised of a QPSK spreader for spreading symbol data of each channel by the real and imaginary parts of its assigned Walsh code, and a QPSK spreader for PN-spreading the orthogonally spread signal with a PN code. Then, a mobile station, which has a plurality of channels, receives the PN-spread signal from the base station, PN-despreads the received signal with a PN code by a QPSK despreader, and orthogonally despreads the PN-despread signal with the assigned orthogonal code by a BPSK despreader. During the orthogonal despreading, the complex conjugate of the estimated pilot channel value is multiplied by the orthogonally despread signal, for compensation.

The first and second embodiments of the present invention provides mutual compatibility between an IMT-2000 (including IS-95C) system and an existing IS-95A or IS-95B system by implementing a QPSK orthogonal spreading/despreading structure for the IMT-2000 system/mobile station with a BPSK orthogonal spreading/despreading structure of the IS-95A or IS-95B base station/mobile station maintained. Furthermore, an IMT-2000 base station transmitter has a single QPSK orthogonal spreading structure, thereby maintaining compatibility between channels.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A demodulation method in a mobile station having a plurality of channels, for receiving a signal from a base station having a plurality of channels, said base station further having a BPSK (Binary Phase Shift Keying) spreader for orthogonally spreading symbol data of each channel with an assigned orthogonal code, and a PN (Pseudorandom Noise) spreader for PN-spreading the orthogonally spread signal with a PN code, and transmitting a BPSK spread and PN spread signal to the mobile station, the demodulation method comprising the steps of:

receiving the BPSK spread and PN-spread signal;

PN-despreading the BPSK spread and PN-spread signal with the PN code by a PN despreader; and orthogonally despreading the BPSK spread and PN-despread signal with a complex orthogonal code having real and imaginary parts of the assigned orthogonal code by a QPSK despreader.

2. The demodulation method of claim 1, wherein the orthogonal despreading step comprises the sub-steps of:

estimating a pilot channel signal among channels received from the base station;

calculating a complex conjugate of a pilot channel estimation value; and multiplying the orthogonally despread signal by the complex conjugate to adjust the orthogonally despread signal.

3. A demodulating device in a mobile station having a plurality of channels, for receiving a signal from a base station having a plurality of channels, said base station further having a BPSK (Binary Phase Shift Keying) spreader for orthogonally spreading symbol data of each channel with an assigned orthogonal code, and a PN (Pseudorandom Noise) spreader for PN-spreading the orthogonally spread signal with a PN code, and transmitting a BPSK spread and PN spread signal to the mobile station, the demodulating device comprising:

a PN despreader for receiving the BPSK spread and PN-spread signal and PN-despreading the BPSK spread and PN-spread signal with the PN code using a QPSK (Quadrature Phase Shift Keying) mode; and a QPSK orthogonal despreader for orthogonally despreading the BPSK spread and PN-despread signal with a complex orthogonal code having real and imaginary parts of the assigned orthogonal code in a QPSK mode.

4. The demodulating device of claim 3, further comprising:

a channel compensator for adjusting the orthogonally despread signal by estimating a pilot channel signal among channels received from the base station, calculating a complex conjugate of a pilot channel estimation value, and multiplying the orthogonally despread signal by the complex conjugate.

* * * * *